(12) United States Patent
Kawabata et al.

(10) Patent No.: US 7,949,770 B2
(45) Date of Patent: May 24, 2011

(54) DATA MANAGEMENT SERVER, DATA MANAGEMENT METHOD AND COMPUTER PROGRAM

(75) Inventors: Hiroyuki Kawabata, Kawanishi (JP); Kazuo Inui, Itami (JP); Hisashi Uchida, Kuze-gun (JP); Kiyoshi Emori, Takatsuki (JP); Daisetsu Tohyama, Amagaski (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1452 days.

(21) Appl. No.: 11/023,407

(22) Filed: Dec. 29, 2004

(65) Prior Publication Data

US 2005/0198330 A1 Sep. 8, 2005

Related U.S. Application Data

(63) Continuation-in-part of application No. 10/811,858, filed on Mar. 30, 2004, now abandoned.

(30) Foreign Application Priority Data

Aug. 6, 2003 (JP) .................................. 2003-288050
Jun. 2, 2004 (JP) .................................. 2004-165067

(51) Int. Cl.
*G06F 15/16* (2006.01)

(52) U.S. Cl. ........................................................ 709/229

(58) Field of Classification Search .................. 709/223, 709/225, 229
See application file for complete search history.

(56) References Cited

U.S. PATENT DOCUMENTS

| | | | | |
|---|---|---|---|---|
| 5,819,295 A | * | 10/1998 | Nakagawa et al. | 707/203 |
| 5,956,715 A | * | 9/1999 | Glasser et al. | 707/9 |
| 6,119,157 A | * | 9/2000 | Traversat et al. | 709/220 |
| 6,814,512 B2 | * | 11/2004 | Kato | 400/76 |
| 7,111,024 B2 | * | 9/2006 | Koppich et al. | 707/203 |
| 7,171,468 B2 | * | 1/2007 | Yeung et al. | 709/225 |
| 7,224,491 B2 | * | 5/2007 | Shinchi et al. | 358/400 |
| 2001/0042126 A1 | * | 11/2001 | Wong et al. | 709/229 |
| 2002/0016872 A1 | * | 2/2002 | Anzai et al. | 710/15 |
| 2007/0103715 A1 | * | 5/2007 | Nakata | 358/1.14 |

FOREIGN PATENT DOCUMENTS

JP 2001-175387 6/2001

(Continued)

*Primary Examiner* — Ario Etienne
*Assistant Examiner* — Hee Soo Kim
(74) *Attorney, Agent, or Firm* — Buchanan Ingersoll & Rooney PC

(57) ABSTRACT

A data management server that can prevent data stored in a user's folder on the server from being used by others when the user is not working, even in a client-server network environment. The data management server that manages data that can be used by multiple terminal devices, and constitutes a storage device in which separate storage areas are allocated for each user. A determination unit determines which of the terminal devices is in a state in which it is able to access the data management server. When a terminal device issues a request to access a separate storage area of the storage device, if it is determined by the determination unit that the terminal device of a user associated with the separate storage area is in a state in which it can access the data management server, an access management unit permits the requesting terminal device to access the data stored in the separate storage area. If the associated user's terminal device is not in such a state, the access management unit denies access to the data stored in the separate storage area. In an alternative embodiment, limited access for certain types of processes may be permitted when the associated user's terminal device is not in the access-enabled state.

18 Claims, 12 Drawing Sheets

FOREIGN PATENT DOCUMENTS

| | | |
|---|---|---|
| JP | 2001-282667 | 10/2001 |
| JP | 2001282667 A * | 10/2001 |
| JP | 2002-063008 | 2/2002 |
| JP | 2002-288135 | 10/2002 |
| JP | 2003-5937 | 1/2003 |
| JP | 2003-15882 | 1/2003 |
| JP | 2003-030028 | 1/2003 |

* cited by examiner

| FOLDER NAME | NON-CONNECTION ACCESS ID |
|---|---|
| FOLDER FLA | S1 |
| FOLDER FLB | S1 |
| FOLDER FLC | S3 |
| FOLDER FLD | S2 |
| FOLDER FLE | S5 |
| ⋮ | ⋮ |

| | | WRITE | REWRITE | DELETE | PRINT | READ | FORWARD | VIEW |
|---|---|---|---|---|---|---|---|---|
| | CONNECTED | ○ | ○ | ○ | ○ | ○ | × | ○ |
| NON-CONNECTED | ACCESS OPTION S1 | ○ | × | × | × | × | × | × |
| | ACCESS OPTION S2 | × | × | × | × | × | × | ○ |
| | ACCESS OPTION S3 | ○ | × | ○ | × | × | × | × |
| | ACCESS OPTION S4 | × | × | × | ○ | × | × | ○ |
| | ACCESS OPTION S5 | × | × | × | × | ○ | × | × |
| | ACCESS OPTION S6 | × | × | × | × | × | ○ | × |

DATA MANAGEMENT SERVER, DATA MANAGEMENT METHOD AND COMPUTER PROGRAM

This is a continuation-in-part of U.S. application Ser. No. 10/811,858, filed Mar. 30, 2004, the contents of which are incorporated herein by reference.

BACKGROUND OF THE INVENTION

1. Field of the Invention

The present invention relates to a technology to enable networked terminal devices to access a shared folder located on a computer such as a server.

2. Description of the Related Art

Technologies for sharing folders located on a computer on a network with multiple other computers have been proposed in the conventional art.

According to the system described in Japanese Laid-Open Patent Application No. 2003-15882, for example, each user, using a networked client computer, can access a shared folder on a server and run programs stored in this shared folder. This type of system is generally termed a 'client-server network'. With a client-server network, if a shared folder is created for each user on the server, users can store their individual data on the server.

In Japanese Laid-Open Patent Application Nos. 2003-5937 and 2001-175387, a system is described whereby documents located on any of multiple networked devices can be shared by any such device. This type of system is generally called a 'peer-to-peer network'.

In a peer-to-peer network, when a user's own terminal device is powered off, or when it is not connected to the network, the files stored on that terminal device cannot be used by other users. Therefore, the problem of other users accessing the user's own files on the user's terminal device without the user's knowledge while the user is not operating the terminal device is of little concern.

However, a peer-to-peer network is not suitable for a large-scale network system. Furthermore, in order for a folder on a terminal device to be shared, the terminal device must be equipped with a server function. Therefore, such a network is not suitable for small-scale terminal devices such as a PDAs (Personal Digital Assistants) or cellular telephones.

On the other hand, because all documents are centrally managed from the server in a client-server network, such a network is well suited for management of users' shared folders in a large-scale system.

However, in a client-server network, the contents of a user's shared folder (e.g. data) can be accessed by others without the user's knowledge, regardless of whether the user is operating the terminal device.

In another approach, a file can be sent and received by email. However, if the file is large, the email server may refuse to accept the file, making this approach unsuitable for file sharing on a consistent basis.

OBJECTS AND SUMMARY

An object of the present invention is to provide an improved data management server, data management method and computer program that eliminate the problems described above.

Another object of the present invention is to provide a data management server, data management method and computer program that, even in a client-server network environment, can prevent data stored in a user's folder on the server from being accessed by others when the user is not working at his terminal device.

These and other objects are achieved by providing a data management server that manages data that can be used by multiple terminal devices and constituting:

a storage device in which separate storage areas are allocated for each user;

a determination unit that determines which of the terminal devices is in a state in which it is able to access the data management server; and an access management unit that, when a terminal device issues a request to access a separate storage area of the storage device, if it is determined by the determination unit that the terminal device of a user associated with the separate storage area is in a state in which it can access the data management server, permits the requesting terminal device to access the data stored in the separate storage area, while if the terminal device is not in such a state, denies access to the data stored in the separate storage area.

The above data management server may further include an identification information notification unit that issues, to the terminal device that has requested access to the data management server, identification information that identifies separate storage areas regarding, from among all users to whom separate storage areas are allocated, only those users who are using a terminal device determined by the determination unit to be in a state in which it can access the data management server. It is furthermore acceptable if (i) the determination unit makes the above determination at prescribed intervals, (ii) the identification information notification unit determines, based on the results of the most recent determination described above, the users regarding whom the above identification information will be given, and the access management unit determines whether or not to permit access based on the results of the most recent determination described above.

The data can constitute an executable file, i.e., application software, that is executed on the data management server, and when a terminal device requests that this executable file be run, the access management unit permits the executable file to be run when it is determined by the determination unit that the terminal device of the user associated with the separate storage area in which the executable file is stored is in a state in which it can access the data management server, but does not permit the executable file to be run when it is determined that the terminal device is not in such a state.

These and other objects are also achieved by a data management method that manages a storage unit in which separate storage areas are allocated for each user, such method including the steps of:

when a request to access a separate storage area of the storage unit is received from a terminal device, determining whether or not the terminal device of the user associated with the separate storage area is in a state in which it can access the storage unit; and when it is determined that the terminal device is in such the state in which it can access the storage unit, permitting the requesting terminal device to access the data stored in the separate storage area, but denying access when the terminal device is not in such a state.

These and other objects are also achieved by providing a computer program that is run on a computer having a storage unit in which separate storage areas are allocated to each user, such computer program executing on the computer the processes of:

determining terminal devices that are in a state in which they can access the computer; and when a request to access a separate storage area of the storage unit is received from a terminal device, and it is determined that the terminal device of the user associated with the separate storage area is in a state in which it can access the computer, permitting the requesting terminal device to access the data stored in the separate storage area, but denying access where the terminal device is not in such a state.

According to the present invention, persons other than the user are prevented from using files stored in the user's folder when the user is not working, even in a client-server network environment, thereby improving security.

In certain implementations of the invention, when a determination is made that access to an individual storage area is not enabled, it may not be necessary to completely deny access. Rather, the access prohibition can be partial. For instance, reading of data may be permitted, but execution of prescribed processes on the data or the writing of data to the individual storage area may be prohibited.

In accordance with some aspects of the invention, therefore, the ease of use of an individual's storage area while that user is not in communication with the server can be improved.

BRIEF DESCRIPTION OF THE DRAWINGS

These and other objects and features of the present invention will become clear from the following description taken in conjunction with the preferred embodiments thereof with reference to the accompanying drawings, in which:

FIG. 12 shows an example of a non-connection access right table;

FIG. 13 shows an example of an access right setting table;

FIG. 15 is a flow chart to explain an example of the sequence of operations of a process to determine whether or not access is to be permitted when in a non-connected state.

DETAILED DESCRIPTION OF THE DISCLOSED EMBODIMENTS

Figure 1:
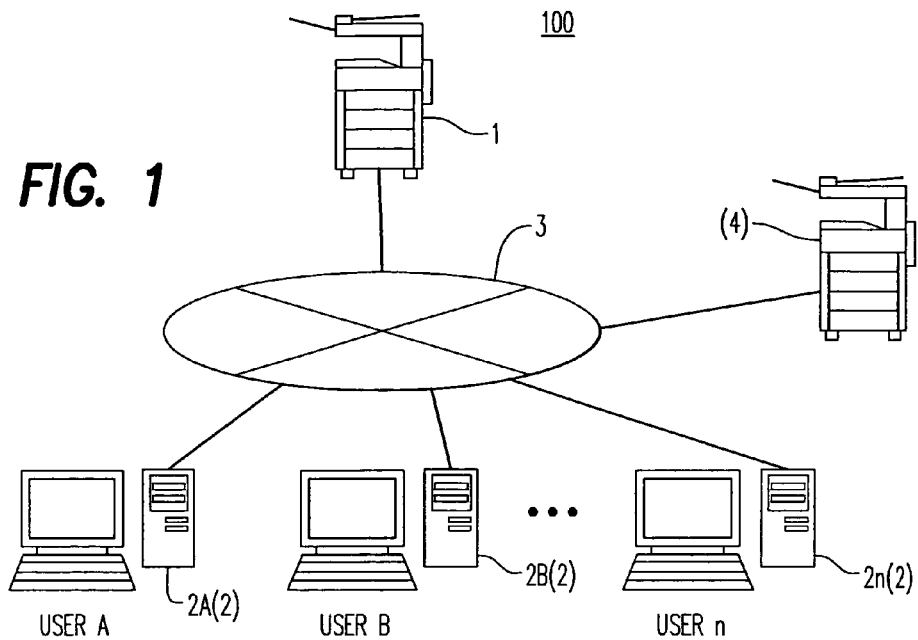
FIG. 1 shows an example of the construction of a file sharing system having a multifunction apparatus pertaining to the present invention.
Figure 2:
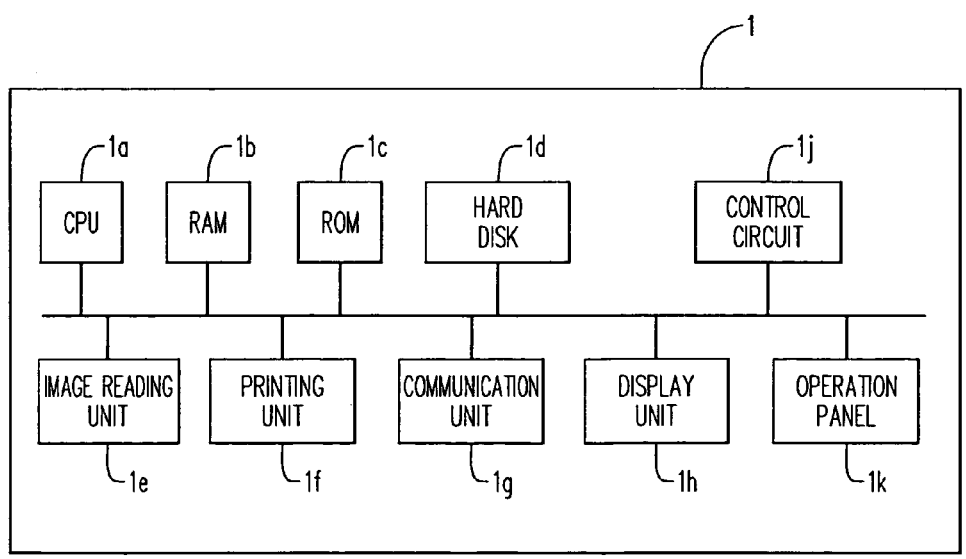
FIG. 2 shows an example of the hardware construction of the multifunction apparatus.
Figure 3:
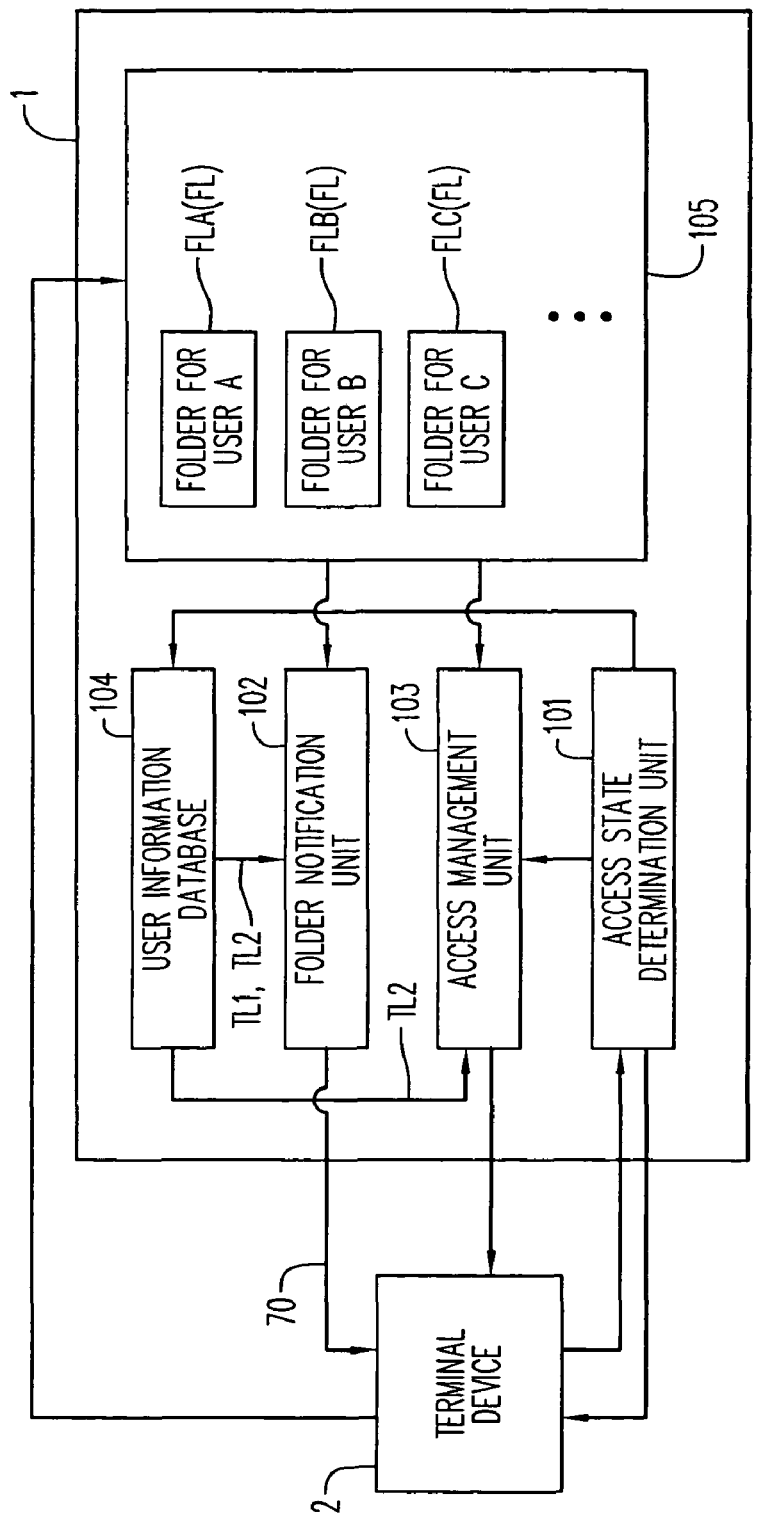
FIG. 3 shows an example of the functional construction of the multifunction apparatus.
Figure 4:
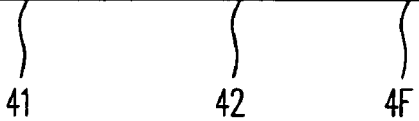
FIG. 4 shows an example of a terminal device information table.
Figure 5:
FIG. 5 shows an example of a folder information table.
Figure 6:
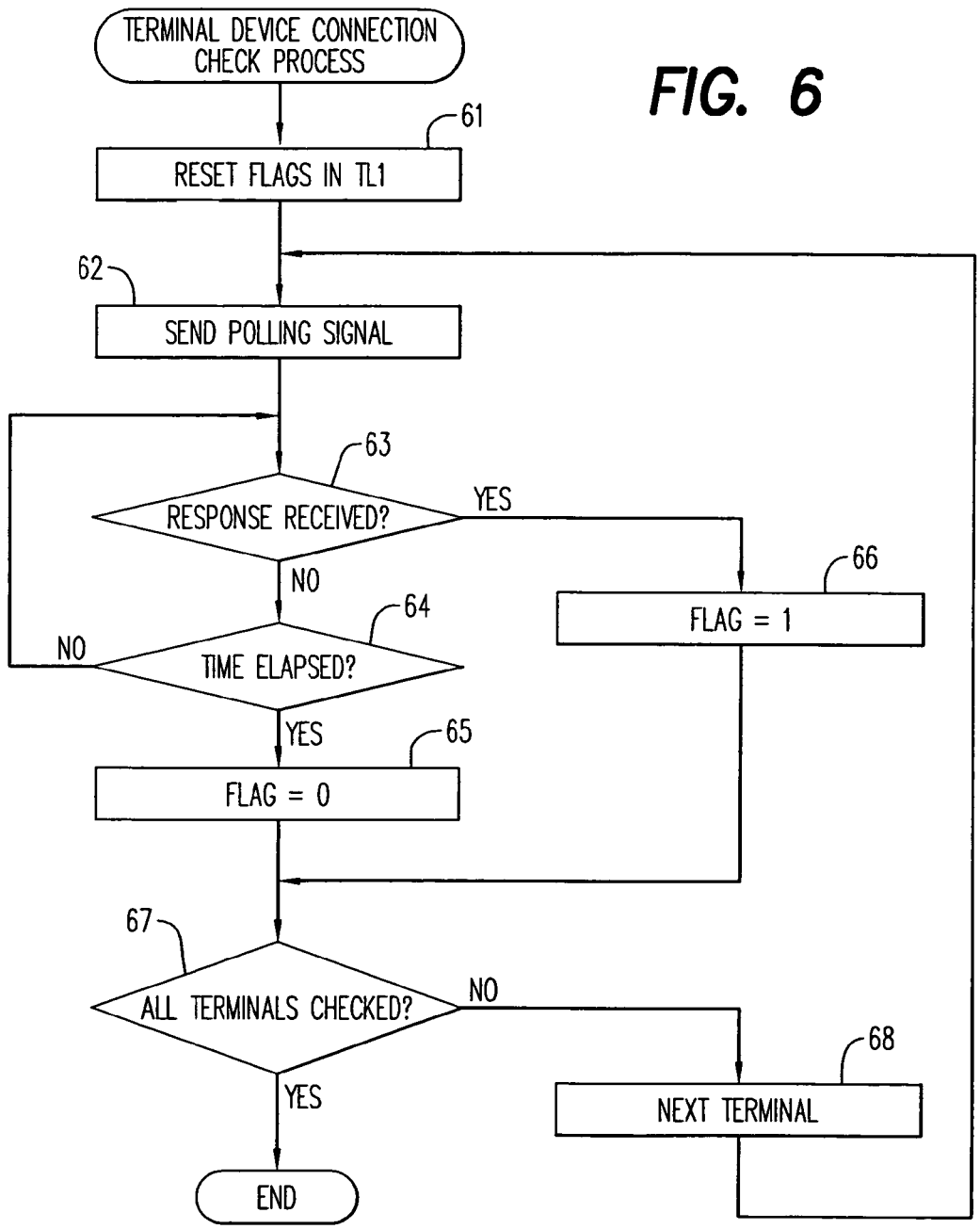
FIG. 6 is a flow chart to explain an example of the sequence of operations of a terminal device connection confirmation process.
Figure 7A:
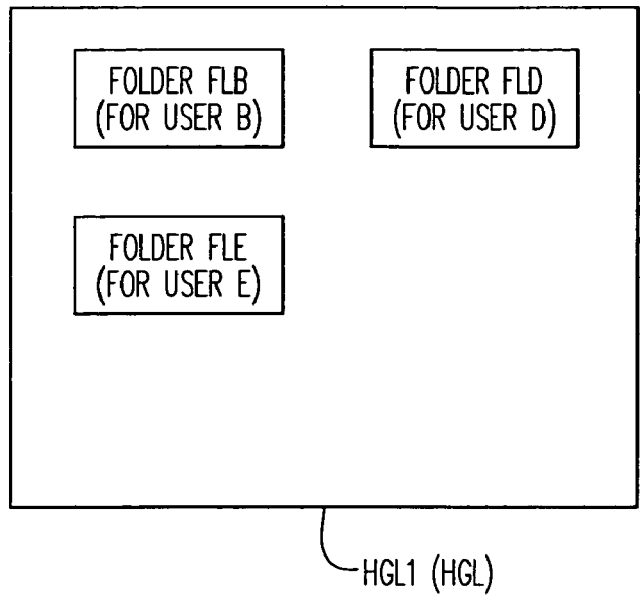
FIGS. 7(a) and 7(b) show examples of a list view screen.
Figure 7B:
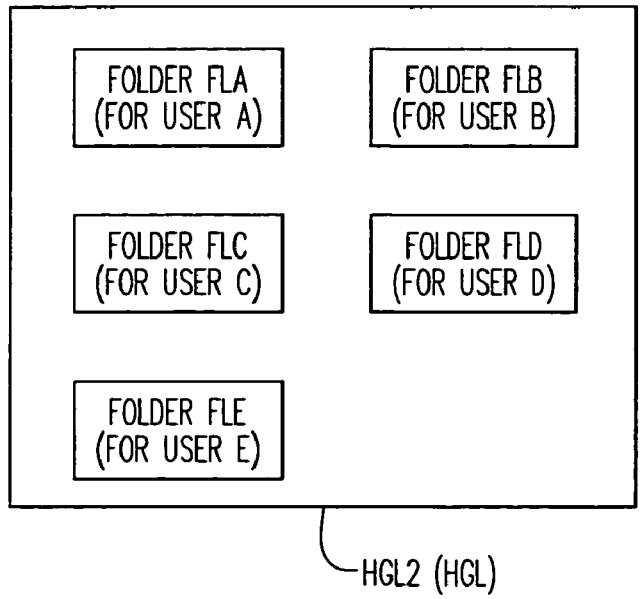
Figure 8:
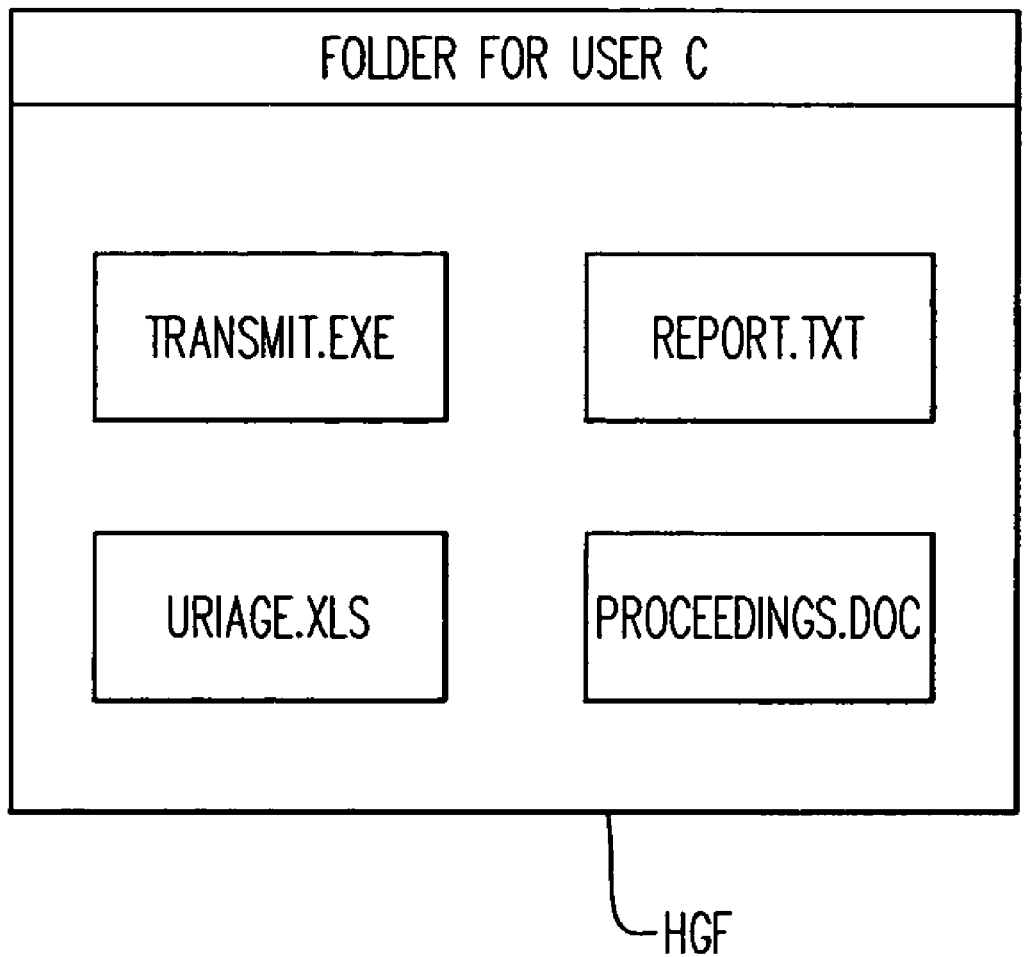
FIG. 8 shows an example of a folder contents screen.

FIG. 1 shows an example of the construction of a file sharing system 100 having a multifunction apparatus 1 pertaining to the present invention, FIG. 2 shows an example of the hardware construction of the multifunction apparatus 1, FIG. 3 shows an example of the functional construction of the multifunction apparatus 1, FIG. 4 shows an example of a terminal device information table TL1, FIG. 5 shows an example of a folder information table TL2, FIG. 6 is a flow chart of the sequence for confirming connection of a terminal device, FIG. 7 shows an example of a list view screen HGL, and FIG. 8 shows an example of a folder contents screen HGF.

As shown in FIG. 1, the file sharing system 100 is composed of a multifunction apparatus 1 that serves as the data management server pertaining to the present invention, multiple terminal devices 2A, 2B and so forth, and communication lines 3. The multifunction apparatus 1 and terminal devices 2 are interconnected over the communication lines 3, and a portion of the data managed by the multifunction apparatus 1 is shared among the multiple terminal devices 2. For the communication lines 3, the Internet, an intranet, public telephone lines or dedicated lines may be used. TCP/IP or FTP may be used as the communication protocol. Where the network of the file sharing system 100 is a LAN, NetBEUI or SMB (Server Message Block) may be used.

Each user is assigned a terminal device 2. The terminal device 2 may be a personal computer, workstation, PDA (Personal Digital Assistant) or cellular telephone.

The multifunction apparatus 1 is an apparatus that combines the functions of a copier, printer, scanner, facsimile machine and/or document server, for example, and may be referred to as an MFP (Multifunction Peripheral). As shown in FIG. 2, the multifunction apparatus 1 is composed of a CPU 1a, RAM 1b, ROM 1c, hard disk 1d, image reading unit 1e, printer unit 1f, communication unit 1g, display unit 1h, control circuit 1j, an operation panel 1k, and other components.

The control circuit 1j is a circuit that controls the hard disk 1d, the image reading unit 1e, the printer unit 1f, the communication unit 1g and the display unit 1h, as well as other components. Configuration values for these units are stored in the ROM 1c.

Referring to FIG. 3, stored on the hard disk 1d are an OS (operating system), programs and data to implement the functions of an access state determination unit 101, a folder notification unit 102, an access management unit 103, a user information database 104, and a user data storage area 105 on the hard disk 1d. All or part of these programs and data may alternatively be stored in the ROM 1c. Similarly, all or part of the functions shown in FIG. 3 may be implemented by one or more processors (i.e. circuits).

The user data storage area 105 is a storage area that can be used by each user of a terminal device 2. Specifically, a folder (directory) FL is assigned for each user of a terminal device 2 as a separate storage area. Each user can store (save) his own data in his folder FL as files. A maximum amount of data that can be saved in each folder FL may be imposed. Multiple folders FL may be created and assigned for a given user. Access permission may be established separately for each folder FL, and any folder FL may be used as a shared folder.

The user information database 104 stores and manages a terminal device information table TL1 as shown in FIG. 4, that indicates the relationship between each user and the terminal device 2, as well as a folder information table TL2 as shown in FIG. 5, that indicates the relationship between each user and the folders FL.

The terminal device information table TL1 shown in FIG. 4 stores a user name 41, terminal identification information 42 and an access flag 4F for each user. The terminal identification information 42 is information that identifies the terminal device 2 for that user. For this terminal identification information 42, an address (such as an IP address, for example) assigned for the terminal device 2 may be used. Alternatively, the computer name, MAC address or telephone number assigned to the terminal device 2 may be used.

The access flag 4F indicates whether or not that user's terminal device 2 is in a state in which it can access the multifunction apparatus 1 at that moment, i.e. whether it is connected to the multifunction apparatus. '1' indicates that the terminal device 2 is in an accessible state, while '0' indicates that it is not in an accessible state. For example, if the terminal device 2 responds to a polling signal, broadcast signal, ping or the like issued from the multifunction apparatus 1, the access flag 4F indicates '1'. If the terminal device 2 is powered off, or if the terminal device 2 network function is not working, the access flag 4F indicates '0'.

The folder information table TL2 shown in FIG. 5 stores a folder name 51 for each folder FL, a user name 52 for the user who is the owner of that folder FL, and access permission information 5R. The access permission information 5R indicates the users permitted to access that folder FL.

Returning to FIG. 3, the access state determination unit 101 issues an inquiry to each terminal device 2, and determines based on the result of these inquiries whether or not each terminal device 2 is in a state in which it can access the multifunction apparatus 1.

For example, the access state determination unit 101 can issue a broadcast, and determine that the terminal devices 2 corresponding to the addresses collected through this broadcast are in a state in which they can access the multifunction apparatus 1. At the same time, a determination is made that the terminal devices 2 having assigned addresses (see FIG. 4) that are not included in the collected addresses are not in a state in which they can access the multifunction apparatus 1.

Alternatively, this determination may be made through the procedure shown in FIG. 6. In this procedure, after resetting each flag 4F to an initial state, e.g. '0' (#61), the access status determination unit 101 sequentially executes polling to each terminal device 2 (#62), and determines that the terminal devices 2 that responded to the polling signal (YES in #63) are enabled to access the multifunction apparatus 1 (#66). The terminal devices 2 that did not respond to the polling signal (NO in #63, YES in #64) are determined to be disabled from accessing the multifunction apparatus 1 (#65). It is also acceptable if the access status determination unit 101 sends a ping request to each terminal device 2 and determines that the terminal devices 2 that respond thereto are enabled to access to the multifunction apparatus 1.

These determinations are performed periodically. Where there is a change regarding terminal devices 2 that can access the multifunction apparatus 1, the contents of the terminal device information table TL1 shown in FIG. 4 are updated to reflect this change.

Where a broadcast signal is issued from a terminal device 2 that has been powered on or has attained network functioning, the access state determination unit 101 determines that the terminal device 2 has entered the state in which it can access the multifunction apparatus 1, and updates the contents of the terminal device information table TL1 accordingly.

When a terminal device 2 accesses the user data storage area 105, the folder notification unit 102 generates folder information 70 that indicates the names of the folders FL located in the user data storage area 105, and sends this information to the terminal device 2. This causes the list view screen HGL that displays a list of access-enabled folders FL on the terminal device 2, as shown in FIG. 7.

The folder information 70 is generated based on the access permission information 5R (see FIG. 5) that is set for each user's folder FL and the access flag 4F (see FIG. 4) for the user's terminal device 2. Specifically, folder information 70 is generated such that (i) the folder names for the folders FL that satisfy both of the following conditions (1) and (2) are included, and (ii) the folder names for the folders FL that do not satisfy at least one of the conditions (1) and (2) are not included:
  (1) The terminal device 2 of the user who owns the folder FL is determined to be in a state in which it can access the multifunction apparatus 1. In other words, the folder owner's access flag 4F is '1'.
  (2) Permission to access the folder FL has been given to the user of the terminal device 2 that accessed the user data storage area 105.

For example, in the situation shown in FIGS. 4 and 5, user B has not been given permission to access the Folder FLC, and therefore the condition (2) regarding the folder FLC is not satisfied for the user B. Furthermore, because the terminal device 2 of the user A is not in a state in which it can access the multifunction apparatus 1, the condition (1) is not satisfied with regard to the folder FLA. Both conditions are satisfied for the folders FLB, FLD and FLE. Therefore, when user B's terminal device 2 has accessed the user data storage area 105, folder information 70 to display the list view screen HGL 1 shown in FIG. 7(*a*) is generated and is sent to that terminal device 2.

If the user B has been permitted to access all of the folders FLA through FLE, and the access flags 4F for the terminal devices 2 for the users A through E are all '1', folder information 70 to display the list view screen HGL2 shown in FIG. 7(*b*) is generated.

By specifying a folder FL by mouse-clicking on its icon displayed in the list view screen HGL, the user can issue to the multifunction apparatus 1 a request for access to that folder FL. Alternatively, access can be requested by entering the path of the folder FL, the folder name, the URL or other identifying information in the command input screen (prompt screen) using the keyboard. A folder access request can also be issued by operating the operation panel 1*k* (see FIG. 2) of the multifunction apparatus 1. In this case, the list view screen HGL and folder content screen HGF (see FIG. 8) are displayed on the display unit 1*h*.

Returning to FIG. 3, the access management unit 103 receives a request to access a folder FL from a terminal device 2 and determines whether or not the terminal device 2 should be permitted to access the folder FL. If it determines that access should be permitted, the access management unit 103 gives the terminal device 2 permission to access the folder FL and the files stored therein. Otherwise, access is denied.

This determination is made based on the conditions (1) and (2) described above. If both conditions are met, a determination is made that the folder FL may be accessed. If either of the conditions is not met, access is denied. In other words, access is granted only to the folders FL displayed in the list view screen HGL.

Therefore, even if the folder name, path or URL of a folder FL that is not displayed in the list view screen HGL is specified directly via the command input screen, access will be denied unless both of the conditions (1) and (2) above are met.

However, if there is a change in the state or access permission settings for the terminal device 2 belonging to the user who owns the folder FL during the period between display of the list view screen HGL and the issuance of the access request, the result of the access permission determination may vary.

The folder contents screen HGF that displays a list of files stored in the folder FL is displayed on the terminal device 2 that was given permission to access that folder FL, as shown in FIG. 8. The user of the terminal device 2 can use these files for his own work.

For example, the user may select and download to the terminal device 2 a document file to be used for future work (such as a text file, image file or document file created in a word processor). The file can then be opened using the application software installed on the terminal device 2 that corresponds to its file type.

Alternatively, the user may select an executable file for the application software that is used for sending documents and is installed on the multifunction apparatus 1, and can run the application software on the multifunction apparatus 1. The user may then issue a command to the multifunction apparatus 1 to send the document or other file specified by the user to another device 4 (see FIG. 1).

Figure 9:
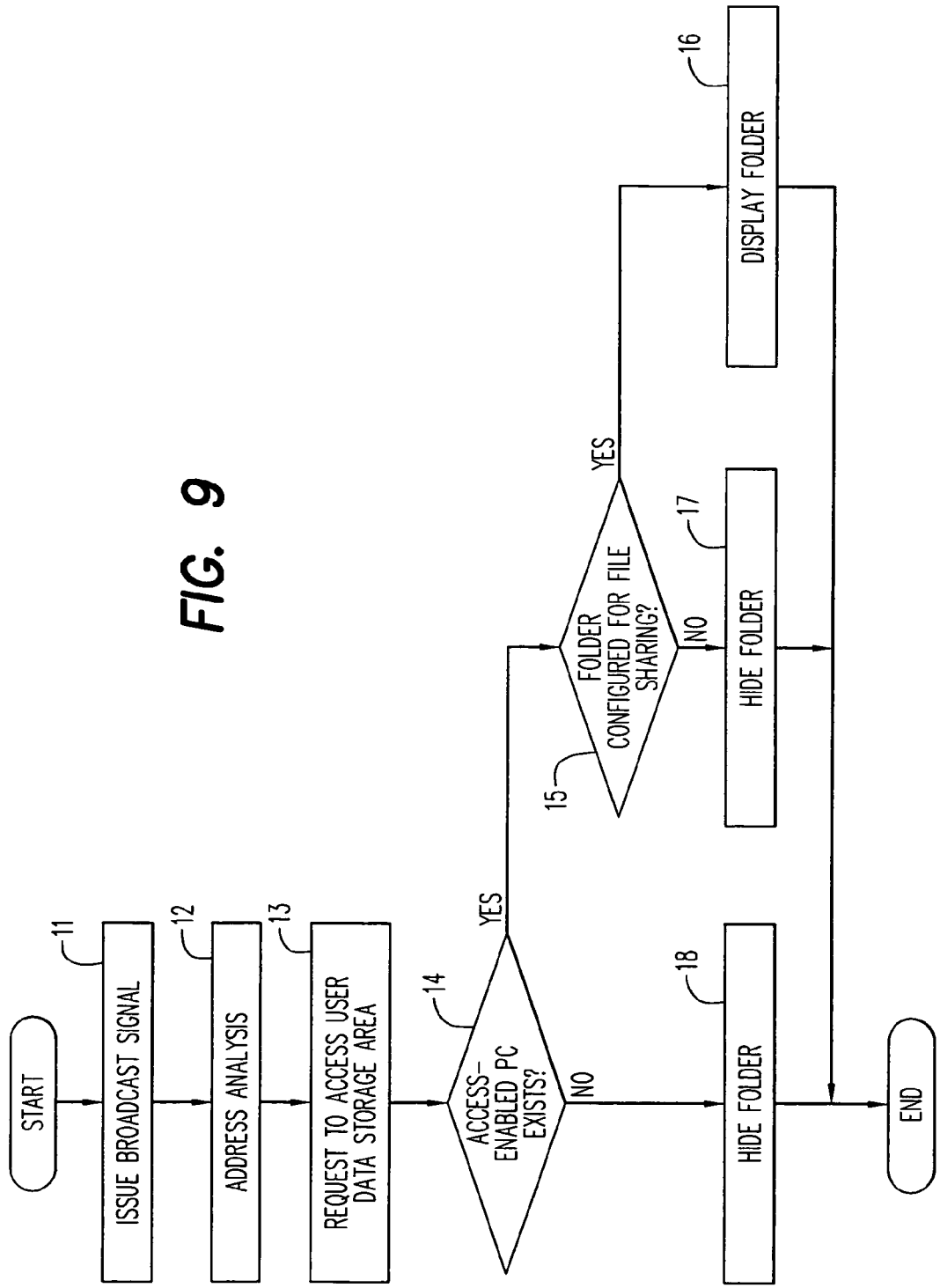
FIG. 9 is a flow chart that explains an example of the processing sequence by which it is determined whether or not the folder name of another user's folder will be displayed.
Figure 10:
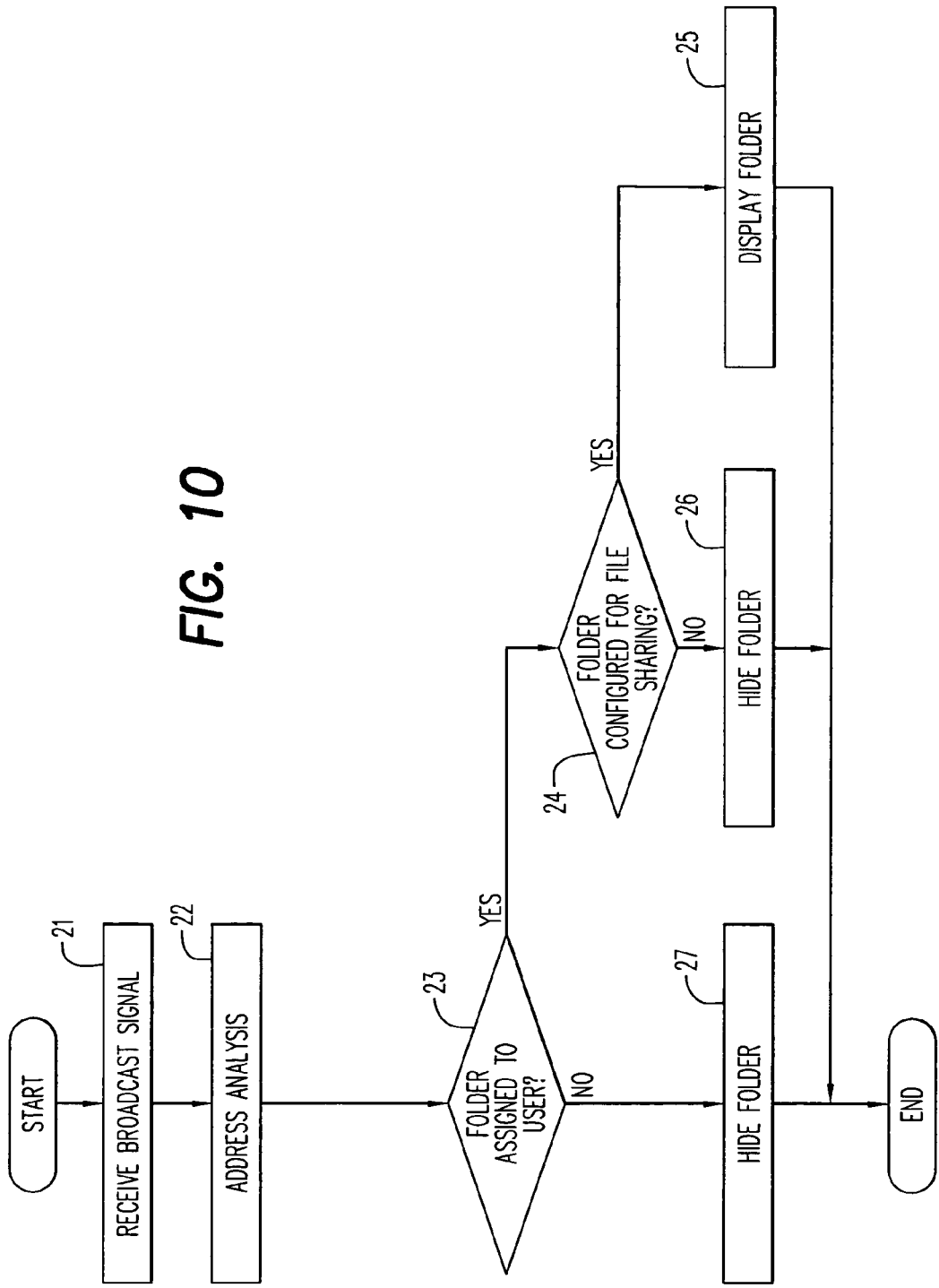
FIG. 10 is a flow chart that explains an example of the processing sequence by which it is determined whether or not the folder name of the user's own folder will be displayed.
Figure 11:
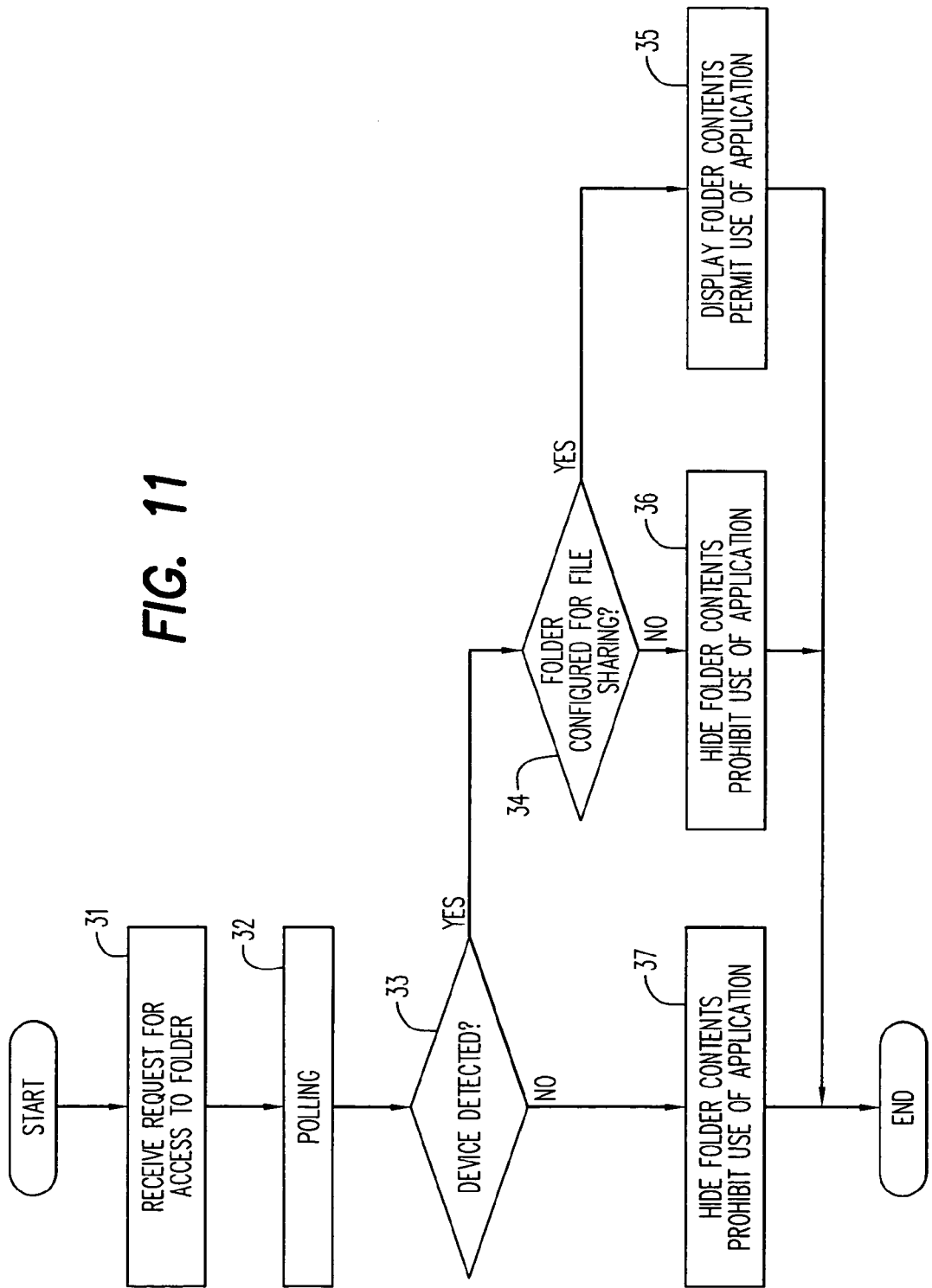
FIG. 11 is a flow chart that explains an example of the processing sequence pertaining to file management performed when a folder is accessed.

FIG. 9 is a flow chart that explains an example of the processing sequence by which it is determined whether or not the folder name of another user's folder FL will be displayed, FIG. 10 is a flow chart that explains an example of the processing sequence by which it is determined whether or not the folder name of the user's own folder FL will be displayed, and FIG. 11 is a flow chart that explains an example of the processing sequence pertaining to file management performed when a folder FL is accessed.

The various processes shown in FIGS. 9-11 are executed by running the programs stored in the ROM 1c or the like using the CPU 1a.

The sequence of operations pertaining to management of the folders FL on the multifunction apparatus 1 will now be explained with reference to the flow charts.

As shown in FIG. 9, the multifunction apparatus 1 broadcasts periodically, issuing broadcast signals over the communication lines 3 (#11). By analyzing the addresses of the devices responding to the signal, the multifunction apparatus 1 determines which of the terminal devices 2 are in a state in which they can access the multifunction apparatus 1 and which are not in such a state (#12). Alternatively, the terminal devices that are in an access-enabled state can be determined by polling the addresses displayed in the terminal identification information 42 for each user's terminal device 2 (see FIG. 4), rather than by broadcasting.

If a request to access the user data storage area 105 (see FIG. 3) in the multifunction apparatus 1 is issued from a user's terminal device 2 (#13), the folder names of other users' folders FL that should be displayed in the list view screen HGL (see FIG. 7) are determined using the method described below.

Where the terminal devices 2 of these other users are in an access-enabled state, and the folders FL of these users are configured for file sharing (i.e., access permission is granted to the requesting user) (YES in #14, YES in #15), the folder names of the folders FL of these other users are identified to be displayed in the list view screen HGL (#16). If access permission has not been given to the requesting user regarding any other user (NO in #15), it is determined that the folder name of the folder FL for such other user will not be displayed in the list view screen HGL, even if the terminal device 2 of the other user is in an access-enabled state (#17).

If the terminal device 2 of any other user is not in a state in which it can access the multifunction apparatus 1 (NO in #14), it is determined that the folder name of the folder FL belonging to such other user will not be displayed in the list view screen HGL, even if the folder FL belonging to such other user is configured for file sharing (#18).

At the same time, whether or not the folder name of the folder FL of the user requesting access in step #13 will be displayed in the list view screen HGL is determined in the manner described below.

Prior to an access request, the terminal device 2 of the requesting user is powered on and enters the state in which it can access the multifunction apparatus 1. At the moment it enters the access-enabled state, the terminal device 2 issues a broadcast.

When the broadcast is issued, the multifunction apparatus 1 receives the broadcast signal as shown in FIG. 10 (#21). It then recognizes from analysis of the associated address that the user's terminal device 2 has entered a state in which it can access the multifunction apparatus 1 (#22).

When in this state, if a request to access the user data storage area 105 is received from the terminal device 2 for that user (corresponding to #13 in FIG. 9), the multifunction apparatus 1 checks whether or not a folder FL has been assigned to the user. If a folder FL has been assigned, the multifunction apparatus 1 further checks whether or not the folder FL has been configured for file sharing (i.e., whether or not access permission has been granted).

If a folder FL has been assigned to the user and has been configured for file sharing (YES in #23, YES in #24), it is determined that the folder name of the user's folder FL will be displayed in the list view screen HGL (#25). If not (NO in #23 or NO in #24), it is determined that the folder name of that user's folder FL will not be displayed in the list view screen HGL (#26 or #27).

As a result of the operations shown in FIGS. 9 and 10, the folder information 70 is sent to the requesting user's terminal device 2 and the list view screen HGL shown in FIG. 7 is displayed. The user can access a folder FL by clicking on the icon of the folder FL in the list view screen HGL.

When this is done, the multifunction apparatus 1 manages the files stored in the selected folder FL in accordance with the following sequence of operations.

As shown in FIG. 11, when a request for notification of the list of files stored in a folder FL or a request for access to any of such files is received (#31), the multifunction apparatus 1 polls the terminal device 2 of the user who owns that folder FL (#32).

Where a response to the polling signal has been received, i.e., where the terminal device 2 belonging to the user who owns the folder FL is detected, and that user's folder FL has been configured for file sharing (YES in #33, YES in #34), the terminal device 2 belonging to the requesting user is notified of the contents of the folder FL, i.e., of a list of the files stored therein (#35). As a result, the folder contents screen HGF shown in FIG. 8 is displayed on the terminal device 2 of the requesting user. Alternatively, where an executable file for application software stored in the folder FL is specified, the executable file is booted on the multifunction apparatus 1 to run the application.

Where there is no response to the polling signal, i.e., where the terminal device 2 belonging to the owner of the folder FL is not detected (NO in #33), it is determined that the terminal device 2 is not currently in a state in which it can access the multifunction apparatus 1. Therefore, the requesting user's terminal device 2 is not notified of the contents of the folder FL (#37). In addition, where an executable file for application software stored in the folder FL is specified, use of that application software is denied.

If the folder FL is not configured for file sharing (NO in #34), the requesting user's terminal device 2 is not notified of the contents of the folder FL, and use of the application software is also denied (#36).

The present invention was described with reference to FIGS. 9-11 using an example in which the user accesses a folder FL by operating his terminal device 2, but such access can instead be performed by operating the operating panel 1*k*. In this case, the multifunction apparatus 1 requests input of the user ID and password in step #13 of FIG. 9. It performs authentication based on the user ID and password, and if it is confirmed that the user is an authorized user, the subsequent operations are carried out as described above. It is also acceptable if input of the user ID and password is also requested when access is carried out using the terminal device 2.

According to this embodiment, when a user is not working at his terminal device, access to the user's folder FL can be denied. In other words, in the conventional art, so long as the server is running, the folder FL is always available to other users regardless of the state of the terminal device 2 belonging to the user owning such folder FL. According to this embodiment, however, access to the folder FL can be managed in accordance with the state of the user's terminal device 2. Therefore, other users are prevented from using the user's folder FL without the user's knowledge, giving the user a sense of security.

Furthermore, the folder FL can be used as a virtual hard disk (local disk) for the terminal device 2. In addition, if the network function of the terminal device 2 is off-line, the folder FL is not visible to other terminal devices, as described above. Therefore, even a device lacking a hard disk or other high-capacity storage means, such as a PDA, may be used as if it were a server in a peer-to-peer network.

In this embodiment, the determination of whether or not the terminal device 2 belonging to the user who owns the folder FL is in a state in which it can access the multifunction apparatus 1 is made via broadcast or polling, but such determination may be made using a different method.

For example, an implementation may be adopted in which the multifunction apparatus 1 is associated with an account for each user, who must log into the multifunction apparatus 1 in order to use the documents stored therein. In this case, during the period from the user's successful login to the user's eventual logoff, it is determined that the user's terminal device 2 is in an access-enabled state. On the other hand, where the user is not logged in, it is determined that the user's terminal device 2 is not in an access-enabled state. Alternatively, the determination as to whether a terminal device 2 is enabled to access the multifunction apparatus can be performed on the basis of an ON/OFF designation made by the user via his terminal device 2 or the operation panel 1*k*.

In this embodiment, the determination of whether or not the terminal devices 2 are in an access-enabled state is made periodically, but the timing of this determination is not limited to this implementation. For example, it is acceptable if the determination of whether or not the terminal device 2 of the user who owns a folder FL is in an access-enabled state is made each time another terminal device 2 accesses that folder FL.

This embodiment was described using an example in which folder sharing was managed using a multifunction apparatus having a document server function, but a so-called UNIX® server or PC server may be used instead of a multifunction apparatus.

Figure 14:
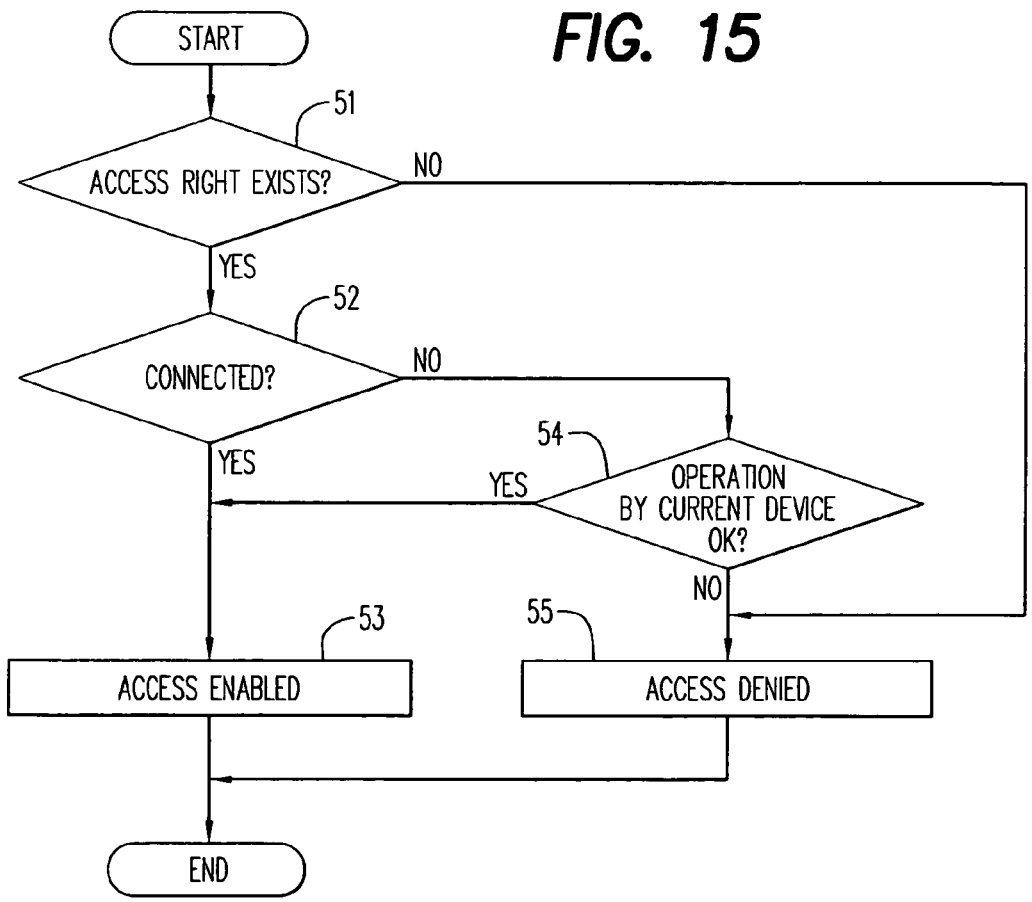
FIG. 14 shows an example of a terminal device information table.

A second embodiment of the invention will now be described with reference to FIGS. 12-16. FIG. 12 shows an example of a non-connection access right table TL3. FIG. 13 shows an example of an access right table TL4. FIG. 14 shows an example of a terminal device information table TL1. FIG. 15 is a flow chart that explains an example of the sequence of operations performed to determine access denial when connection is disabled. FIG. 16 shows an example of a view list screen HGL.

In the first embodiment, access rights for any given user are set for each folder FL as shown in FIG. 5. A user to whom an access right is granted is able to access the folder FL comprising the object of his access right so long as condition (1) is met, i.e., so long as the terminal device 2 of the user who is the owner of such folder FL is enabled to access the multifunction apparatus 1. However, where condition (1) is not met, his access to that folder FL, as well as to the files stored therein, is denied whether or not he possesses an access right to such folder FL.

According to the second embodiment, even when condition (1) is not met, a user to whom an access right has been granted (i.e., a user who meets condition (2)) is allowed to access the folder FL as well as the files stored therein so long as he executes a prescribed process.

The constructions of the file sharing system 100, multifunction apparatus 1 and terminal devices 2 in the second embodiment are basically identical to those described in connection with the first embodiment. However, the folder notification unit 102, access manager 103 and user information database 104 differ in function from the first embodiment. A description is provided below that focuses on these differences. Descriptions of components and functions that are identical to those in the first embodiment are omitted.

The user information database 104 stores and manages the terminal device information table TL1 shown in FIG. 4, the folder information table TL2 shown in FIG. 5, the non-connection access right table TL3 shown in FIG. 12, and the access right setting table TL4 shown in FIG. 13.

The non-connection access right table TL3 stores non-connection access type information 79 that indicates, where the terminal device 2 of the user owning each folder FL is not enabled to access the multifunction apparatus 1 (i.e., where condition (1) is not met), the types of processing permitted with regard to such folder FL and the files stored therein.

The access right setting table TL4 has access type information options S1-S6, which comprise template options for non-connection access type information 79. The user can set non-connection access type information 79 for his own folder FL by designating one of the access type information options S1-S6 for the 'access type while not connected' cell in the non-connection access right setting table TL3 using the operation panel 1*k* or his terminal device 2. The user may also set whether to permit the execution of each type of processing, i.e., 'write' through 'view', without using the access type information options S1-S6.

'Write' in the access right setting table TL4 refers to the writing, i.e., adding, of a file to a folder FL. A circle in the cell for 'write' means that the writing (addition) of a file to that folder FL is permitted even if condition (1) is not met. A cross in the cell means that writing of a file to the folder FL is prohibited in accordance with the principle of condition (1). For the following operations as well, the circle and cross symbols indicate that the associated process is either permitted or prohibited.

'Rewrite' refers to the rewriting, i.e., updating, of the content of a file stored in the folder FL. 'Delete' refers to the deletion, i.e., removal, of a file stored in the folder FL. 'Print' refers to the printing of a document using a file stored in the folder FL.

'Read' refers to the reading of a file in the folder FL on a different device. In other words, it refers to the copying of a file and the transmission of the file copy to a different device. 'Forward' refers to the moving of a file stored in the folder FL to a different device. Unlike when a file is 'read', the forwarded file does not remain in the folder FL. 'View' refers to the display of the files stored in the folder FL on the display unit 1h of the multifunction apparatus 1 for viewing.

A user may want to use his folder FL only for the purpose of receiving files from other users when his terminal device is not connected to the multifunction apparatus 1. For example, he may want to use his folder FL only for the purpose of receiving messages from other users. In such a case, he should select the access type information option S1, under which only 'Write' is enabled.

The user may want to allow users who use the multifunction apparatus 1 to view the files stored in this folder FL but prohibit on-line users (i.e., users working from their own terminal devices 2) all types of processing unless his own terminal device is connected to the multifunction apparatus 1. In other words, in this situation, the user wants to allow only local confirmation of documents (text or image documents) stored on the multifunction apparatus 1. In such a case, he should select the access type information option S2, under which only 'View' is enabled. Conversely, if the user wants to allow only on-line users to use his folder FL, he should select the access information type S5, under which only 'Read' is enabled.

Where the user wants to distribute the files stored in his folder FL in forms other than electronic data, i.e., where the user wants to allow only screen display or hard copy printing, the access type information option S4, under which only 'Print' and 'View' are enabled, should be selected.

Where the user does not wish to have the files stored in his folder FL seen by other users, the access type information option S3, under which only 'Write' and 'Delete' are enabled, should be selected. Alternatively, the user may select the access type information option S1, or prohibit all types of processing in accordance with condition (1) without selecting any options. Where the user wants the administrator to manage his files but does not want the contents thereof seen, the access type information option S3 should be selected.

Where the user wants to permit emergency transfer of the files stored in his folder FL to another folder FL or a storage medium, the access type information option S6, under which only 'Forward' is enabled, should be selected. Selection of the access type information option S6 is particularly effective when seeking to permit emergency transfer of files using a format that cannot be edited.

The folder notification unit 102 shown in FIG. 3 performs processing to determine the accessible folders FL and to display a view list screen that shows a list of such folders FL in a manner similar to that described in connection with the first embodiment. However, in the second embodiment, this processing is performed as described below with reference to the non-connection access right table TL3 and the access right setting table TL4 as well.

For example, a situation may be assumed in which the folder information table TL2 is as shown in FIG. 5, which is identical to the example of the first embodiment, but the terminal device information table TL1 is as shown in FIG. 14. When the user B operates his terminal device 2 and accesses the user data storage area 105, the folder notification unit 102 determines whether or not the user B can access each folder FL according to the procedure shown in FIG. 15.

Because it is seen from the folder information table TL2 that the user B has not been granted an access right to the folder FLC (NO in #51), it is determined that the user B cannot access the folder FLC (#55). In addition, because the user B has been granted an access right to the folder FLB (YES in #51) and the access flag 4F is '1' (YES in #52), it is determined that the user B can access the folder FLB (#53).

Although an access right has been granted to the user B regarding the folder FLD (YES in #51), the access flag 4F is '0' (NO in #52). In such a case, the non-connection access right table TL3 shown in FIG. 12 and the access right setting table TL4 shown in FIG. 13 are referred to The access type information option S2 is selected in the non-connection access right table TL3 as the setting for the folder FLD in the non-connected state. Referring to the access right setting table TL4, it is seen that when the terminal device 2 of the owner of the folder FLD is not connected to the multifunction apparatus 1 (i.e., where the access flag 4F is '0'), viewing of the files stored in the folder FLD is allowed on the multifunction apparatus 1 only. Therefore, it is determined that the user B using his terminal device 2 is denied access (NO in #54 and #55).

When a determination is made with reference to the non-connection access right table TL3 and the access right setting table TL4 regarding the folders FLA and FLE in the same manner as for the folder FLD, it is determined that access is permitted (YES in #54 and #53).

Figure 16A:
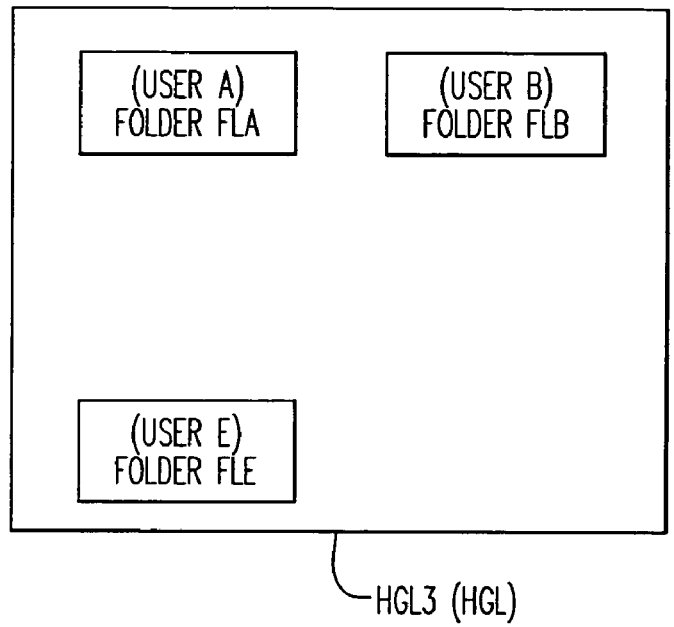
FIGS. 16(a) and 16(b) show examples of a view list screen.

The folder notification unit 102 generates folder information 70 to display a list of folders FL determined to be accessible to the user B, and sends this information to user B's terminal device 2. Consequently, a view list screen HGL3 as shown in FIG. 16(a) is displayed on user B's terminal device 2.

Figure 16B:
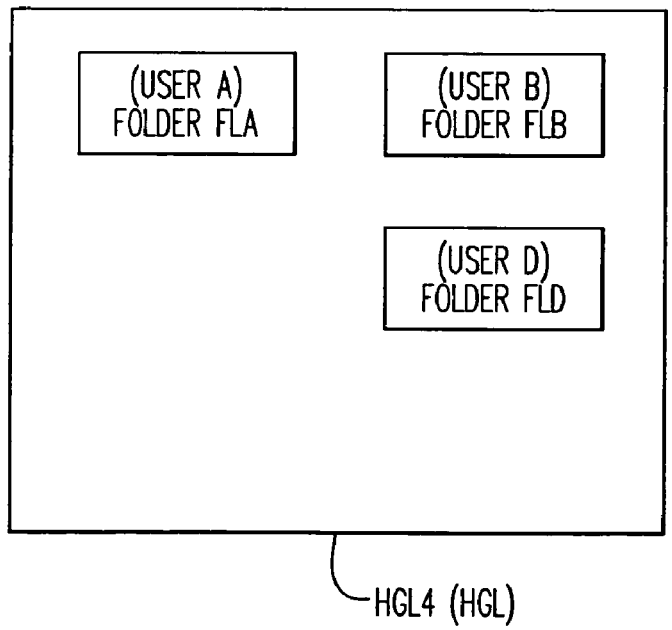

The same processing is carried out by the folder notification unit 102 when the user B accesses the user data storage area 105 using the operation panel 1k. However, in the determination process shown in FIG. 15, because only 'Read' is permitted regarding the folder FLE (see FIGS. 12 and 13), no processing can be performed by a user using the multifunction apparatus 1. Therefore, it is determined that the user B cannot access the folder FLE (NO in #54, #55). At the same time, it is determined with regard to the folder FLD that access is permitted because viewing on the multifunction apparatus 1 only is permitted, as described above (YES in 54, #53). As a result, a view list screen HGL4 as shown in FIG. 16(b) is shown on the display unit 1h.

The access manager 103 shown in FIG. 3 receives a request to access a folder FL from a terminal device 2 and determines whether or not to allow such terminal device 2 to access the folder FL in the same fashion as in the first embodiment. Where it is determined that access should be permitted, the access manager 103 permits the terminal device 2 to access the folder FL and the files stored therein. However, only the processes permitted according to the non-connection access right table TL3 and the access right setting table TL4 are permitted with regard to folders FL (folders FL regarding which 'NO' was determined in #52 in FIG. 15) belonging to users whose terminal devices 2 are not connected to the multifunction apparatus 1.

The sequence of operations of the entire process that takes place in the multifunction apparatus 1 of the second embodiment is identical to the sequence described in connection with the first embodiment shown in FIGS. 10 and 11. However, the determination as to whether or not to permit access to a folder FL belonging to a user whose terminal device 2 is not connected to the multifunction apparatus 1 is carried out according to the procedure shown in FIG. 15 as described above.

According to the second embodiment, when the user is not working on his terminal device, access by other users to his folder FL can be restricted. In other words, while in the conventional art the folder FL was open to other users at all times so long as the server was up and running, regardless of the status of such user's terminal device 2, according to the second embodiment, the types of processing permitted with regard to the folder FL and the files stored therein can be changed depending on the status of the user's terminal device 2. Consequently, the ease of use of the folder FL can be improved while preventing the unanticipated use thereof by other users.

In the second embodiment, non-connection access type information 79 was set for each folder FL, but it is also acceptable if non-connection access type information 79 is set for each file. In this case, the system should be configured such that where the non-connection access type information 79 set for the folder FL and the non-connection access type information 79 for a file stored therein do not match, either the folder setting or the file setting prevails.

Alternatively, it is also acceptable if non-connection access type information 79 can be set for the entire multifunction apparatus 1. For example, it is acceptable if only 'Write' is permitted for users other than the owner of a folder FL when the terminal device 2 of such owner is not connected to the multifunction apparatus 1.

In the second embodiment, full access rights are granted to prescribed users when the terminal device 2 of the owner of a folder FL is connected to the multifunction apparatus 1, while execution of prescribed types of processing is prohibited when the terminal device is not connected to the multifunction apparatus 1 (see FIG. 13), but it is also acceptable if a certain restriction is imposed even when the terminal device 2 is connected to the multifunction apparatus 1 and a more stringent restriction is imposed when the terminal device 2 is not connected to the multifunction apparatus 1.

The present invention may be applied in a network system used by members of a company, school or government organization (such as a company LAN), for managing in a flexible manner the security of each user's storage area (folder or box) in an image forming apparatus or the like. Alternatively, it may be applied in the network system of an ISP (Internet Service Provider) that provides terminal devices in individual homes with Internet access-related services.

Furthermore, the construction of all or part of the file sharing system 100 and multifunction apparatus 1, as well as the contents of processing, the sequence of processing, and the method of determination regarding the state of the terminal devices 2, may be changed freely within the essential scope of the present invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data management server that manages data usable by multiple terminal devices, comprising:
a storage device in which separate storage areas are respectively allocated for individual users of the terminal devices;
a determination unit that determines which of the terminal devices is in a state of being able to access the data management server; and
an access management unit, which is responsive to a request from a first terminal device of a first user to access a second separate storage area of the storage device associated with a second user, to permit the first terminal device of the first user to access the data stored in the second separate storage area associated with the second user, if the determination unit determines that a second terminal device of the second user associated with the second separate storage area is in a state of being able to access the data management server, and to deny the first terminal device of the first user access to the data stored in the second separate storage area if the second terminal device of the second user associated with the second separate storage area is not in a state of being able to access the data management server,
wherein the separate storage areas of the storage device are comprised centrally in the data management server separate from respective locations of the terminal devices of the users.

2. The data management server of claim 1, further comprising an identification information notification unit that issues, to the terminal device that has requested access to the data management server, identification information that identifies separate storage areas regarding, from among all users to whom separate storage areas are allocated, only those users' terminal devices that are determined by the determination unit to be in a state of being able to access the data management server.

3. The data management server of claim 2, wherein
the determination unit makes said determination at prescribed intervals,
the identification information notification unit determines, based on the results of the most recent determination, the users regarding whom the identification information will be given, and
the access management unit determines whether or not to permit access based on the results of the most recent determination by the determination unit.

4. The data management server of claim 1, wherein
said data comprises an executable file of application software for performing a process that is to be executed on the data management server, and
when a terminal device requests that the executable file be run, the access management unit permits the executable file to be run when the determination unit determines that the terminal device of the user associated with the separate storage area in which the executable file is stored is in a state of being able to access the data management server, and does not permit the executable file to be run when the determination unit determines that the associated user's terminal device is not in a state of being able to access the data management server.

5. A data management server that manages data usable by multiple terminal devices, comprising:
a storage device having individual storage areas associated with respective users of the terminal devices, respectively;
an access status determination unit that determines which of the terminal devices are enabled to access said data management server; and
an access management unit that, when access to a first individual storage area associated with a first user is requested by a second user, permits access to the data stored in said first individual storage area, as well as the writing of data to said first individual storage area, when a first terminal device of the first user associated with said first individual storage area is determined by said access status determination unit to be enabled to access the data management server, and otherwise prohibits execution of one or more prescribed processes regarding data stored in said first individual storage area, and the writing of data to said first individual storage area, wherein the individual storage areas of the storage device are comprised centrally in the data management server separate from respective locations of the terminal devices of the users.

6. The data management server according to claim 5, wherein said server stores non-connection access type information that indicates the type of processes that are permitted while the first terminal device of the first user associated with said first individual storage area is not enabled to access the data management server, and when a request to access said first individual storage area is received, said data access management unit prohibits execution of processes regarding the data stored in said first individual storage area other than said permitted types of processes, based on said non-connection access type information for said first individual storage area.

7. The data management server according to claim 6, wherein said permitted types of processes include one or more of the operations of writing, overwriting, deletion, printing, reading, forwarding or viewing of data.

8. The data management server according to claim 5, wherein said prescribed processes include one or more of the operations of overwriting, deletion, printing, reading, forwarding or viewing of data.

9. An image forming apparatus in which individual storage areas are created for respective users, comprising:

an access status determination unit that determines terminal devices that are enabled to access said image forming apparatus; and an access management unit that, when a request to access to a first one of said individual storage areas associated with a first user is received from a second terminal device of a second user, permits the second terminal device of the second user to access the data stored in said first individual storage area when a first terminal device of the first user to whom said first individual storage area belongs is determined by said access status determination unit to be enabled to access said image forming apparatus, and otherwise denies the second terminal device of the second user access to the data stored in said first individual storage area, wherein the individual storage areas are comprised centrally in said image forming apparatus separate from respective locations of the terminal devices of the users.

10. An image forming apparatus in which individual storage areas are created for each user, comprising:

an access status determination unit that determines terminal devices that are enabled to access said image forming apparatus; and an access management unit that, when access to a first one of said individual storage areas associated with a first user is requested by a second terminal device of a second user, permits access to the data stored in said first individual storage area as well as the writing of data to said first individual storage area, when a first terminal device of the first user to whom said first individual storage area belongs is determined by said access status determination unit to be enabled to access said image forming apparatus, and otherwise prohibits execution of prescribed processes regarding the data stored in said first individual storage area, and the writing of data to said first individual storage area, wherein the individual storage areas are comprised centrally in said image forming apparatus separate from respective locations of the terminal devices of the users.

11. A data management method for managing a data storage device that includes individual storage areas which are assigned to respective users and which are located centrally in the data storage device separate from respective locations of terminal devices respectively associated with the users, comprising the following steps that are performed when a request to access a first one of said individual storage areas assigned to a first user is received from a second terminal device of a second user:

determining whether a first terminal device associated with the first user to whom said first individual storage area belongs is enabled to access said data storage device;

permitting the second terminal device of the second user to access the data stored in said first individual storage area assigned to the first user, when the first terminal device of the first user is determined to be enabled to access said data storage device; and otherwise denying the second terminal device of the second user access to the data stored in said first individual storage area assigned to the first user.

12. A data management method for managing a data storage device that includes individual storage areas which are assigned to respective users and which are located centrally in the data storage device separate from respective locations of terminal devices respectively associated with the users, comprising the following steps that are performed when a request to access a first one of said individual storage areas assigned to a first user is received from a second terminal device of a second user:

determining whether a first terminal device associated with the first user to whom said first individual storage area belongs is enabled to access said data storage device;

permitting said access to the second terminal device of the second user when said first terminal device of the first user is determined to be enabled to access said data storage device; and otherwise prohibiting the second terminal device of the second user from executing prescribed processes on the data stored in said first individual storage area assigned to the first user.

13. The method of claim 12, wherein said prescribed processes include one or more of the operations of overwriting, deletion, printing, reading, forwarding or viewing of data.

14. A non-transitory computer-readable medium having a computer program recorded thereon that causes a computer having a data storage device including individual storage areas assigned to respective users to execute:

a process to determine terminal devices that are enabled to access said computer; and a process in which, when a first terminal device of a first user requests access to a second one of said individual storage areas assigned to a second user, if a second terminal device of the second user to whom said second individual storage area belongs is determined to be enabled to access said data storage device, said first terminal device of the first user is permitted to access the data stored in said second individual storage area assigned to the second user, and said first terminal device of the first user is otherwise denied access to the data stored in said second individual storage area assigned to the second user, wherein the individual storage areas are comprised centrally in said data storage device separate from respective locations of the terminal devices of the users.

15. A non-transitory computer-readable medium having a computer program recorded thereon that causes a computer having a data storage device including individual storage areas assigned to respective users to execute:

a process to determine terminal devices that are enabled to access said computer; and a process in which, when a first terminal device of a first user requests access to a second one of said individual storage areas assigned to a second user, if a second terminal device of the second user to whom said second individual storage area belongs is determined to be enabled to access said data storage device, the first terminal device of the first user is permitted to access the data stored in said second individual storage area and the writing of data to said second individual storage area, and the first terminal device of the first user is otherwise prohibited from executing prescribed processes regarding the data stored in said second individual storage area as well as writing data to said second individual storage area, wherein the individual storage areas are comprised centrally in said data storage device separate from respective locations of the terminal devices of the users.

16. The non-transitory computer-readable medium of claim 15, wherein said prescribed processes include one or more of the operations of overwriting, deletion, printing, reading, forwarding or viewing of data.

17. The data management server of claim 1, wherein each user is respectively assigned to one of the terminal devices.

18. The data management server of claim 1, wherein the terminal devices are each one of a personal computer, workstation, personal digital assistant and mobile telephone.

* * * * *